Dec. 19, 1922.
R. F. BOOP.
HAND PLANTER ATTACHMENT.
FILED SEPT. 17, 1920.
1,439,601.
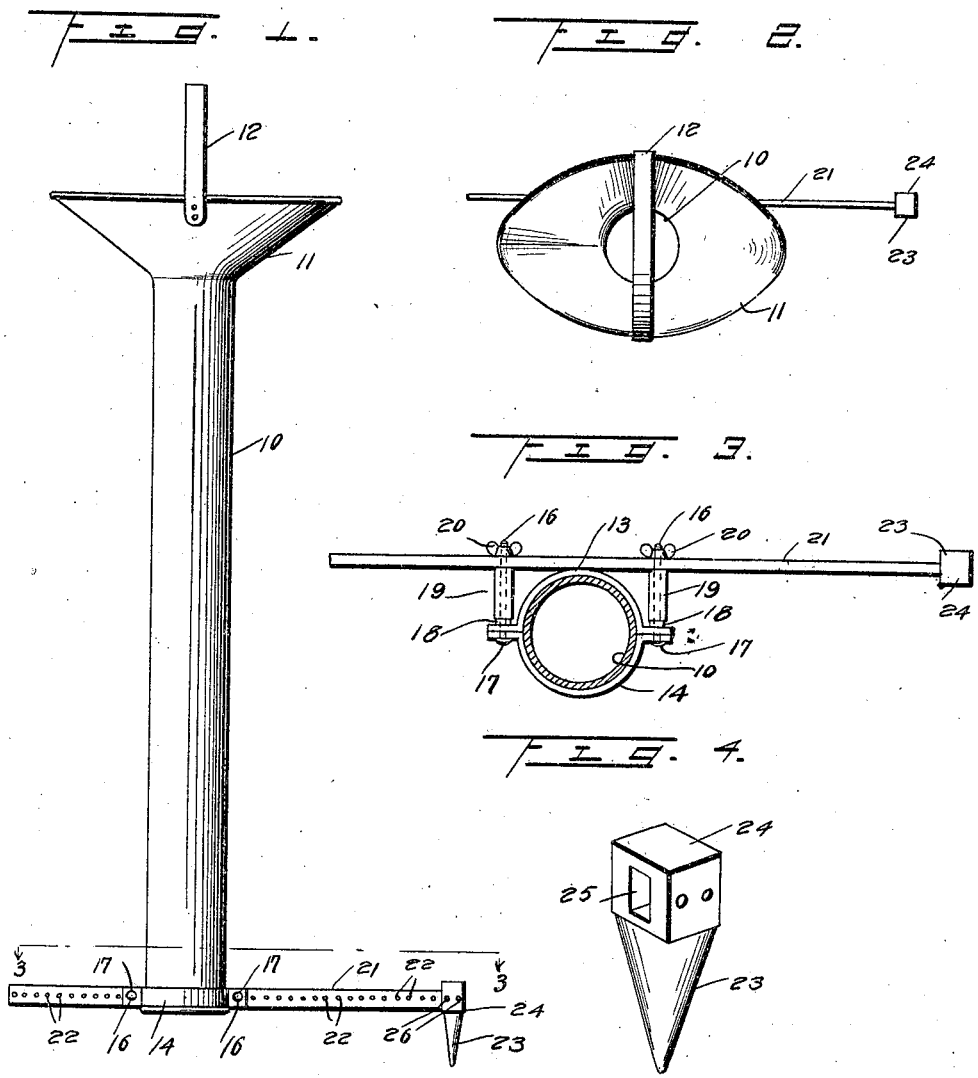
INVENTOR.
R. F. Boop
BY
ATTORNEY.

Patented Dec. 19, 1922.

1,439,601

UNITED STATES PATENT OFFICE.

RUFUS F. BOOP, OF MILLMONT, PENNSYLVANIA.

HAND-PLANTER ATTACHMENT.

Application filed September 17, 1920. Serial No. 410,828.

*To all whom it may concern:*

Be it known that I, RUFUS F. BOOP, a citizen of the United States, residing at Millmont, in the county of Union and State of Pennsylvania, have invented certain new and useful Improvements in a Hand-Planter Attachment; and I do hereby declare the following to be a full, clear, and exact description of the invention, such as will enable others skilled in the art to which it appertains to make and use the same.

The object of the invention is to provide a simple and conveniently operable device for use in planting potatoes, corn and various kinds of grain and seeds which are ordinarily planted by hand, and particularly those which it is desirable to plant in hills or at regular intervals in a row and for example in sockets or depressions or seats formed in the soil for their reception, to enable the operator while maintaining a standing or upright position to accurately position and deposit the articles or seeds to be planted; and furthermore to provide a device for the purpose indicated wherein the intervals between the hills or points of deposit of the seed in a row may be regulated or adjusted to suit the character of the seed and the conditions under which the same is planted; and with these objects in view the invention consists in a construction and combination of parts of which a preferred embodiment is shown in the drawing, wherein:

Figure 1 is a side view of a planter embodying the invention.

Figure 2 is a plan view of the same.

Figure 3 is a horizontal section on the plane indicated by the line 3—3 of Figure 1.

Figure 4 is a detail view in perspective of the peg or dibble.

The device consists essentially of a tube 10 of suitable diameter, provided at its upper end with a funnel 11 which is preferably elongated and as illustrated in the drawing, elliptical in form with a transverse looped handle or grip 12 adapted to be grasped by the operator by one hand while the seeds are deposited successively with the other hand in the funnel to be carried by the tube 10 to the point of deposit in the soil at the lower end thereof. Embracing the lower end of the tube is a clamp consisting of the substantially semi-circular members 13 and 14 having outturned terminal ears 15 which are engaged in pairs by transverse bolts 16 having terminal heads 17 and washers 18, spacing blocks 19 being fitted upon the bolts and engaged by thumb nuts 20.

In connection with the planter, for use when a definite spacing between the hills or places of deposit in the row of the seed is desired, there is used a marker consisting of the bar 21 which is seated upon the spacing blocks 19, so as to lie in a position tangential to the tube 10 and having perforations 22 arranged at suitable intervals for engagement by the bolts 16, said bar being held in place by the thumb nuts 20, and carried by the bar is a peg or dibble 23 in turn adjustably mounted upon said bar for movement toward and from the planting tube 10. In the construction illustrated the peg is provided with a squared head 24 in which is provided a transverse slot 25 for the reception of the bar 21, and the intersecting pins 26 engage the bar and secure the peg or dibble at the desired adjustment, so that when the lower end of the planter tube is pressed downward upon the soil the peg is correspondingly engaged with the soil at the interval to which it has been adjusted, to mark the place for the planting for the next seed or the location of the next succeeding hill. This as the planting of the row progresses the marker operating in advance of the deposit of the seed serves to definitely indicate the location of the succeeding hills.

It will be understood that the planter consisting of the tube having the terminal receiving funnel and handle may be operated independently of the marker when an accurate spacing of the hills in the row is not required, and that when such accurate spacing is necessary or preferred, the marker may readily be applied to the tube and adjusted to indicate any desired interval between the hills for the convenience and guidance of the operator, who not only may maintain an upright position while planting, but may use the planter tube as a rest or cane to in some degree relieve or rest him in the work of planting. By the use of this device the necessity for stooping or bending to properly deposit or place the seed is entirely eliminated while an increased accuracy in the deposit of the seed is effected with a minimum of effort.

Having thus described the invention, what I claim is:

1. A marker attachment for a planter tube consisting of a marker bar, clamp sections to surround the tube, said bar contacting with one of said sections, and securing means common to said bar and sections.

2. A marker attachment for a planter tube consisting of a marker bar, clamp sections to surround the tube having terminal ears, securing bolts passing through said ears and bar, said bar contacting with one of said sections intermediate its ends, and spacing sleeves on said bolt intermediate said bar and ears.

3. A marker attachment for a planter tube consisting of a marker bar provided with a row of openings, a marker member adjustable on the bar, securing means for insertion in certain of said openings to secure said marker member in adjusted position, and means for insertion in other of said openings to secure the bar in adjusted position upon the tube.

In testimony whereof I affix my signature in presence of two witnesses.

RUFUS F. BOOP.

Witnesses:
GERTIE C. BOOP,
EDNA B. G. BOOP.